US005475528A

United States Patent [19]
LaBorde

[11] Patent Number: 5,475,528
[45] Date of Patent: Dec. 12, 1995

[54] OPTICAL SIGNAL AMPLIFIER GLASSES

[75] Inventor: Pascale LaBorde, La Grande Paroisse, France

[73] Assignee: Corning Incorporated, Corning, N.Y.

[21] Appl. No.: 217,734

[22] Filed: Mar. 25, 1994

[51] Int. Cl.$^6$ .................................................. C03C 13/04
[52] U.S. Cl. .............. 359/341; 359/343; 372/6; 372/40; 501/60; 501/62; 501/63
[58] Field of Search ................... 359/341, 343; 372/6, 40; 501/60, 62, 63

[56] References Cited

U.S. PATENT DOCUMENTS

| | | | |
|---|---|---|---|
| 3,640,891 | 2/1972 | Lee et al. ............................ | 252/301.4 |
| 3,857,689 | 12/1974 | Koizumi et al. ...................... | 65/30 |
| 3,942,991 | 3/1976 | Baak ................................... | 106/52 |
| 4,038,090 | 7/1977 | Gliemeroth .......................... | 106/53 |
| 4,076,541 | 2/1978 | Rapp ................................... | 106/47 Q |
| 4,155,735 | 5/1979 | Ernsberger ........................... | 65/30 |
| 4,576,920 | 4/1986 | MacDowell .......................... | 501/10 |
| 4,962,067 | 10/1990 | Myers .................................. | 501/45 |
| 5,128,801 | 7/1992 | Jansen et al. ......................... | 359/343 |

OTHER PUBLICATIONS

"Operation of Erbium–Doped Fiber Amplifiers and Lasers Pumped with Frequency–Doubled Nd:YAGL Lasers", Journal of Lightwave Technology, vol. 7, No. 10, pp. 1474–1477, Oct., 1989, M. C. Farries et al.

E. Desurvire et al., "High–Gain Erbium–Doped Traveling–Wave Amplifier", Optical Letters, vol. 12, No. 11, pp. 388–390, Nov., 1987.

*Primary Examiner*—Mark Hellner
*Attorney, Agent, or Firm*—Milton M. Peterson

[57] ABSTRACT

An optical signal amplifier comprising an optical waveguide fiber integrated by thallium ion exchange in a boron-free silicate glass doped with up to 5 weight % erbium oxide, the glass having a base composition, as calculated in weight percent on an oxide basis, consisting essentially of

| | | | |
|---|---|---|---|
| $SiO_2$ | 38–67 | $Al_2O_3$ | 1.5–4.5 |
| $Na_2O$ | 0–20 | ZnO | 1.5–8 |
| $K_2O$ | 0–25 | $Li_2O$ | 0–1 |
| $Na_2O + K_2O$ | 15–30 | PbO | 0–37 |
| BaO | 0–7 | $P_2O_5$ | 0–10 |
| | | $P_2O_5$ + PbO | 5–37 |

16 Claims, 1 Drawing Sheet

OPTICAL SIGNAL AMPLIFIER GLASSES

FIELD OF THE INVENTION

Glasses for use in signal amplifiers operating at wavelengths around 1.5 microns.

BACKGROUND OF THE INVENTION

Optical waveguide signal amplifiers comprise a glass, optical waveguide fiber doped with an optically active material. The dopant, for example, is a rare earth metal oxide, and an amplifier effect is developed by stimulated emission. Pump light is injected into one end of the amplifier fiber. The pump light is emitted from a laser at the wavelength of absorption of the doped glass amplifier fiber. Modulated signal light is also injected at a wavelength in the spectral band of emission of the doped glass amplifier. An amplified optical signal is extracted from the waveguide at the other end of the amplifier fiber.

Such an amplifier is described in E. Desurvire et al., "High-Gain Erbium-Doped Traveling-Wave Fiber Amplifier", Optical Letters, Vol. 12, No. 11, pages 388– 390, November, 1987. An amplifier of this type is also described by M. C. Farries et al., "Operation of Erbium-Doped Fiber Amplifiers and Lasers Pumped with Frequency-Doubled Nd:YAGL Lasers", Journal of Lightwave Technology, Vol. 7, No. 10, pages 1474–1477, October, 1989.

Such amplifiers are intended for use in long distance, optical fiber, telecommunications systems which today appear very promising. They present the advantage of eliminating the opto-electronic conversion of signals by acting directly on the optical signal. In order to achieve the level of amplification necessary, an amplifier waveguide is currently on the order of one to several meters in length. This is for a signal transmitted at a wavelength of 1.5 microns, one of the typical wavelengths used in optical telecommunications.

Ion-exchanged materials doped with rare earth metals have been described. See, for example, Najafi et al., "Ion-Exchanged Rare-Earth Doped Waveguides", SPIE, Vol. 1128, Glasses for Opto Electronics, 1989, pages 142–144. An example described in that publication is a slab waveguide made by $Ag^+$-$Li^+$ ion exchange in a neodymium-doped, lithium silicate glass substrate.

U.S. Pat. No. 5,128,801 (Jansen et al.) describes an optical signal amplifier with a waveguide path integrated into a glass body. The glass body is doped with optically active material. The signal to be amplified is transmitted through the waveguide, and the pump power is coupled into the waveguide at one end.

The present invention is concerned with a family of glasses that find particular utility in production of such a signal amplifier. These glasses are capable of being doped with high contents (up to 5 wt. %) of erbium oxide. Thus, they are characterized by long, excited-state lifetimes.

It is known that boron has a strong competitive effect on the excited-state, radiative transition to the ground state in erbium-doped glasses. This effect occurs through the multiphonon, non-radiative relaxation that leads to very low, excited state lifetimes. Accordingly, glasses of the present invention are boron-free. At the same time, the glasses possess the physical and chemical properties required for ion-exchange.

SUMMARY OF THE INVENTION

The invention comprehends an optical signal amplifier comprising an optical waveguide fiber integrated by thallium ion exchange in a boron-free, silicate glass doped with up to 5 weight % erbium oxide, the glass having a base composition, as calculated in weight % on an oxide basis, consisting essentially of

| | | | |
|---|---|---|---|
| $SiO_2$ | 38–67 | $Al_2O_3$ | 1.5–4.5 |
| $Na_2O$ | 0–20 | $ZnO$ | 1.5–8 |
| $K_2O$ | 0–25 | $Li_2O$ | 0–1 |
| $Na_2O + K_2O$ | 15–30 | $PbO$ | 0–37 |
| $BaO$ | 0–7 | $P_2O_5$ | 0–10 |
| | | $P_2O_5 + PbO$ | 5–37 |

The invention is also embodied in a family of glasses that are particularly adapted to use in optical signal amplifiers operating at a wavelength of about 1.5 microns, that are free of $B2O_3$, that are capable of being doped with up to 5 weight % erbium oxide, that have good spectroscopic properties, and that have base glass compositions consisting essentially of, on an oxide basis as calculated in weight %,

| | | | |
|---|---|---|---|
| $SiO_2$ | 38–67 | $Al_2O_3$ | 1.5–4.5 |
| $Na_2O$ | 0–20 | $ZnO$ | 1.5–8 |
| $K_2O$ | 0–25 | $Li_2O$ | 0–1 |
| $Na_2O + K_2O$ | 15–30 | $PbO$ | 0–37 |
| $BaO$ | 0–7 | $P_2O_5$ | 0–10 |
| | | $P_2O_5 + PbO$ | 5–37 |

DESCRIPTION OF THE INVENTION

Figure 1:
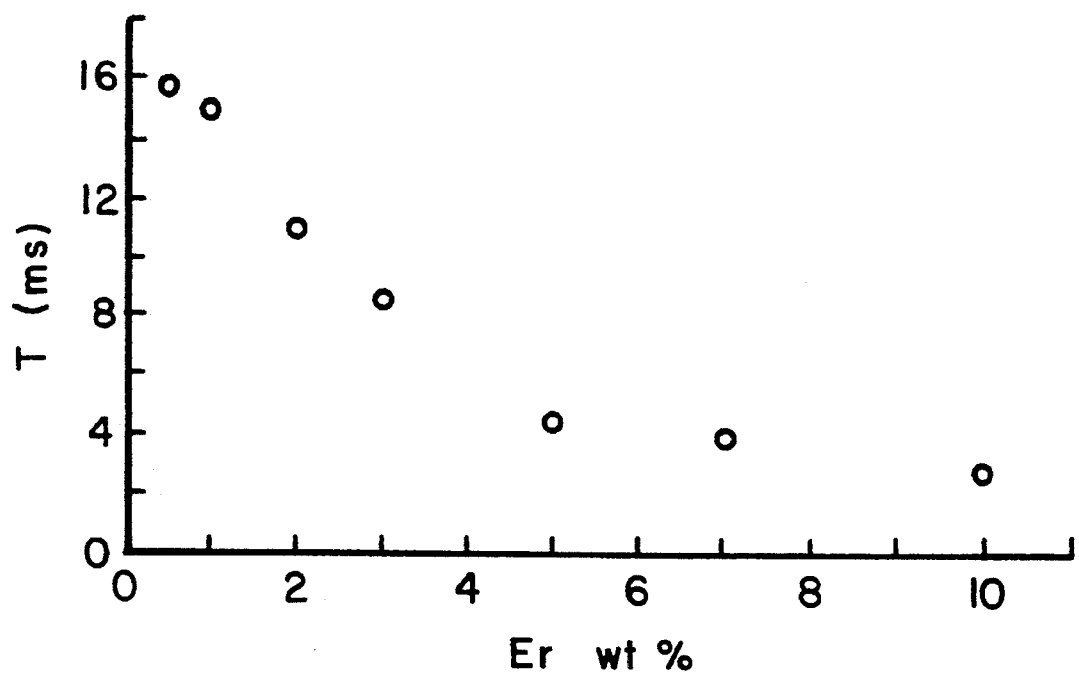
FIGS. 1 and 2 in the accompanying drawing are graphical representations of relevant properties measured on glasses in accordance with the present invention.

The present invention provides a family of glasses having general utility, particularly in lighting, optical and electronic applications. However, the glasses have unique features that render them of particular value in the production of an integrated, optical waveguide signal amplifier.

One feature of the present glasses is their freedom from boric oxide ($B_2O_3$). As explained earlier, it has been known that $B_2O_3$ exerts a very strong degrading effect on the spectroscopic effects in a glass doped with a rare earth metal oxide. However, $B_2O_3$ is commonly used for its beneficial effects on coefficient of thermal expansion and temperature-viscosity relationship in silicate glasses. The constituents of the present glasses are so proportioned that $B_2O_3$ is unnecessary and is omitted.

A further feature of the present glasses is their ability to be doped with relatively large amounts of erbium oxide ($Er_2O_3$). In the absence of $B_2O_3$ in the base glass, such doping has been found to provide excellent fluorescent effects which are vital for signal amplification by laser light pumping. In particular, the present erbium-doped, boron-free glasses may have an excited-state lifetime that is at least 8 ms in length. The emission bandwidth of the 4 I 13/2–4 I 15/2 transition is around 20 nm, and the emission cross-section at a wavelength of 1538 nm may be higher than $5 \times 10^{-25}$ $m^2$.

The glasses of the invention are predicated in large measure on my discovery that the $B_2O_3$ content in prior borosilicate glasses can be replaced with oxides of lead (PbO) and/or phosphorus ($P_2O_5$). When such replacement is made, the depressing effect of $B_2O_3$ is avoided, and the desirable properties of an erbium-doped glass are obtained. Furthermore, the new $B_2O_3$-free glasses possess essentially as good properties for thallium ion exchange as did the prior borosilicate glasses. This enables burying an optical waveguide in the glass by ion exchange.

The properties required for thallium ion exchange are:

1. A transformation range (Tg) below 500° C. to permit thallium ion exchange in the temperature range of 350°–450° C.

2. A sufficient amount of Na and/or K ions to exchange with thallium.

3. A ratio of K/Na ions equal to or greater than 2 to preserve the rate of exchange with thallium.

4. Good durability of the glass to withstand chemical attack during the masking and ion exchange processes.

My new glasses are capable of meeting these requirements, as well as providing the emission characteristics necessary successful signal amplification. The glasses have a silica base, are boron-free, and must contain at least one oxide selected from $Na_2O$ and $K_2O$, and at least one oxide selected from $P_2O_5$ and PbO. Optionally, the glasses may contain minor amounts of divalent oxides, particularly BaO and ZnO.

Alumina ($Al_2O_3$) is effective in broadening the erbium emission spectra at around 1.5 microns. Therefore, the glass must have an $Al_2O_3$ content sufficiently high to achieve this effect. $Al_2O_3$ also tends to improve glass durability, and thereby enable the glass to withstand chemical attack during processing. However, the $Al_2O_3$ content must not exceed about 4.5% to avoid a glass transformation range higher than 500° C.

The alkali metal oxides, $Na_2O$ and $K_2O$ must be present to provide a glass that is ion-exchangeable with thallium ions. The oxides also serve to soften the glass, that is provide a low Tg glass. Preferably, the glasses contain both oxides with a $K_2O:Na_2O$ ratio of at least 2:1. A ratio greater than 2:1 appears to provide optimum conditions for ion exchange with thallium. While either alkali metal oxide may be omitted from the present glasses, their total content must be within the range of 15–30 weight %. The maximum $Na_2O$ content is about 20% and the maximum $K_2O$ is about 25%.

The present glasses provide a glass transformation range below 500° C., preferably in the range of 350°–450° C. This is highly desirable to permit ion exchange at a relatively low temperature, thus minimizing loss of thallium by volatilization. I have found that a content of either $P_2O_5$ or PbO, preferably both oxides, is necessary to meet this requirement in the absence of $B_2O_3$. The $P_2O_5$ content should not exceed about 5 weight %, while the PbO content may be as high as about 37% by weight. Either oxide may be absent from the glass composition. However, the presence of at least one of the two oxides is necessary, and their total content should be in the range of 5–37% by weight.

The presence of PbO in a glass enhances the refractive index of the glass. Likewise, this property may be enhanced by the presence of the divalent oxides BaO and ZnO in the amounts indicated.

TABLE I sets forth the essential composition ranges for the present glasses.

TABLE I

| | | | |
|---|---|---|---|
| $SiO_2$ | 38–67 | ZnO | 1.5–8 |
| $K_2O$ | 0–25 | $Li_2O$ | 0–1 |
| $Na_2O$ | 0–20 | PbO | 0–37 |
| $Na_2O + K_2O$ | 15–30 | $P_2O_5$ excess | 0–5 |
| BaO | 0–7 | $P_2O_5$ + PbO | 5–37 |
| $Al_2O_3$ | 1.5–4.5 | | |

TABLE II defines narrower, preferred ranges for the oxide constituents of the present glasses. Optimum properties for optical signal amplifiers, and for their production, obtain within these narrower ranges.

TABLE II

| | | | |
|---|---|---|---|
| $SiO_2$ | 52–56 | $Al_2O_3$ | 1.5–4.5 |
| $Na_2O + K_2O$ | 18–26 | ZnO | 1.5–8 |
| $Na_2O/K_2O$ | 0.3–0.5 | PbO | 10–15 |
| BaO | 0–3 | $P_2O_5$ excess | 0–5 |
| | | $P_2O_5$ + PbO | 15–20 |

TABLE III sets forth several specific compositions illustrating glasses suitable for the purposes of the present invention. The compositions are set forth in % by weight with the $P_2O_5$ content (when present) being in excess of 100. The TABLE also reports property values measured on glasses having the indicated compositions. In the property listing, Tg is the glass transformation temperature in °C.; nd is the refractive index of the glass; $Er^+$ is the content of erbium, in ions per $cm^3 \times 10^{20}$, with which the glass is doped; E is emission bandwidth of the glass doped with the indicated amount of erbium; T is the excited-state lifetime of the erbium in milliseconds (ms).

TABLE III

| Wt % | 1 | 2 | 3 | 4 | 5 | 6 | 7 |
|---|---|---|---|---|---|---|---|
| $SiO_2$ | 67 | 54.7 | 55.8 | 55.4 | 38.3 | 55.8 | 54.2 |
| $Na_2O$ | 6.4 | 5.7 | 5.7 | 5.8 | 4.7 | 5.7 | 0 |
| $K_2O$ | 19.1 | 17.1 | 17.1 | 17.3 | 14 | 17 | 24.9 |
| BaO | 3.2 | 2.8 | 2.8 | 0 | 2.3 | 2.9 | 2.8 |
| $Al_2O_3$ | 2.1 | 1.9 | 1.9 | 1.9 | 1.5 | 1.9 | 1.8 |
| ZnO | 2.2 | 1.9 | 1.9 | 3.4 | 1.5 | 1.9 | 1.9 |
| $Li_2O$ | 0 | 0.9 | 0 | 1 | 0.8 | 0 | 0 |
| PbO | 0 | 15 | 14.8 | 15.2 | 36.9 | 14.8 | 14.4 |
| $P_2O_5$ excess | 5 | 0 | 5 | 0 | 0 | 5 | 5 |
| Properties | | | | | | | |
| Tg(°C.) | 435 | 416 | 412 | 416 | 377 | 405 | 435 |
| nd | 1.504 | 1.544 | 1.542 | 1.544 | 1.613 | 1.5391 | 1.5373 |
| T(ms) | 9.8 | 9 | 9.8 | 8.5 | 12 | 10 | >11 |

TABLE III-continued

| | | | | | | | |
|---|---|---|---|---|---|---|---|
| $Er^{3+}(cm^3)$ 10E-20 | 1.58 | 1.76 | 1.18 | 1.74 | 1.43 | 0.59 | 0.6 |
| Emission Bandwidth (nm) | 21 | 21 | 21 | 21 | 20 | 20 | 20 |
| Emission Peak(nm) | 1538 | 1538 | 1538 | 1538 | 1538 | 1537 | 1537 |

| Wt % | 8 | 9 | 10 | 11 | 12 | 13 |
|---|---|---|---|---|---|---|
| $SiO_2$ | 59 | 63.5 | 52.5 | 52 | 59.6 | 58.9 |
| $Na_2O$ | 18.3 | 6.3 | 0 | 0 | 6.2 | 6.1 |
| $K_2O$ | 0 | 18.9 | 24.7 | 24.4 | 18.6 | 18.4 |
| BaO | 3 | 3.2 | 2.7 | 5.8 | 3.1 | 6.6 |
| $Al_2O_3$ | 2 | 2.1 | 3.9 | 1.8 | 4.5 | 2.1 |
| ZnO | 2.1 | 6 | 1.9 | 1.9 | 8 | 7.9 |
| $Li_2O$ | 0 | 0 | 0 | 0 | 0 | 0 |
| PbO | 15.6 | 0 | 14.3 | 14.1 | 0 | 0 |
| $P_2O_5$ excess | 5 | 5 | 5 | 5 | 5 | 5 |
| Properties | | | | | | |
| Tg(°C.) | 421 | 433 | 430 | 445 | 462 | 445 |
| nd | 1.5392 | 1.512 | 1.5371 | 1.5421 | 1.5165 | 1.5221 |
| T(ms) | 9 | 11.5 | 11 | 12 | 9 | 11 |
| $Er^{3+}(cm^3)$ 10E-20 | 0.57 | 0.56 | 0.6 | 0.6 | 0.55 | 0.56 |
| Emission Bandwidth (nm) | 20 | 20 | 20 | 20 | 20 | 20 |
| Emission Peak(nm) | 1537 | 1537 | 1537 | 1537 | 1537 | 1537 |

The invention is further illustrated with reference to the accompanying drawings which are graphical representations of properties measured on glasses in accordance with the invention.

FIG. 1 is a plot of erbium concentration in weight percent on the horizontal axis versus excited-state lifetime in milliseconds plotted on the vertical axis. It is apparent that lifetimes above 8 milliseconds can be obtained with an erbium loading of up to about 3 %. It has been found that glasses doped with amounts of erbium greater than about 3 weight % tend to quench, that is undergo a condition which greatly reduces the excited-state lifetime.

Figure 2:
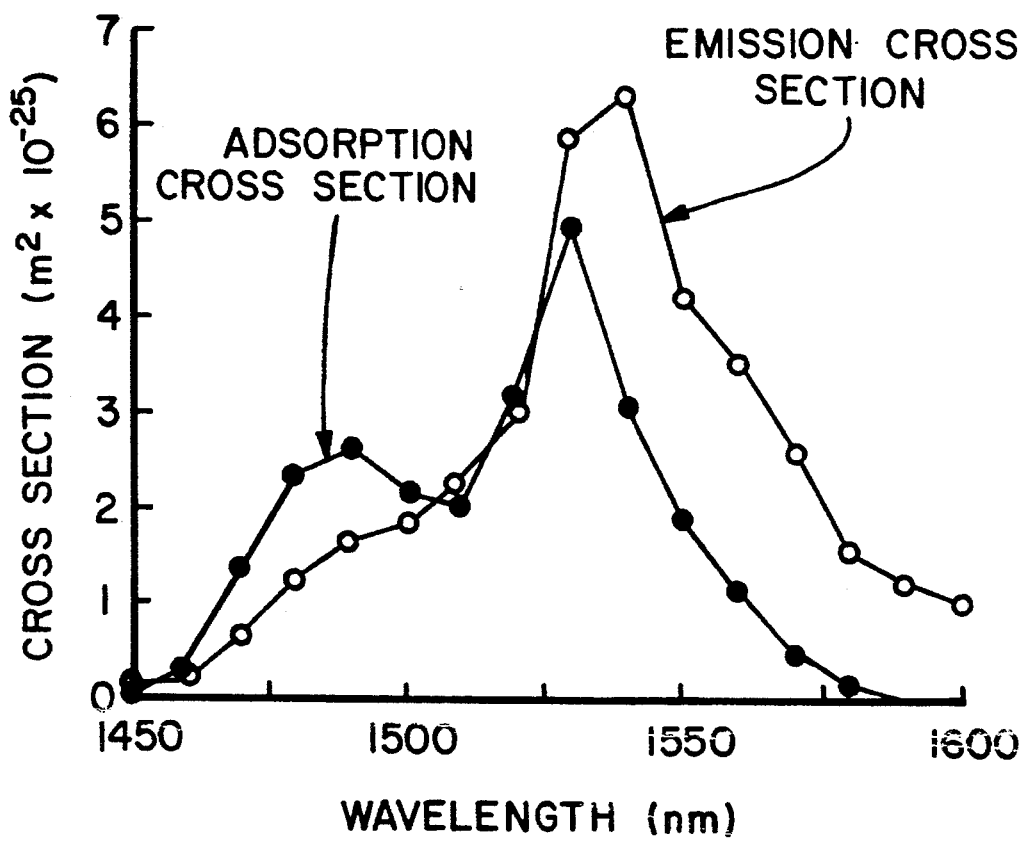

FIG. 2 is a plot showing the emission cross-section and the absorption cross-section tier a silicate glass having an erbium doping level of $3.3\times10^{19}$ atoms/$cm^3$ and a lifetime of about 8 ms. Wavelength is plotted in nanometers (nm) on the horizontal axis, while cross-section in $meters^2 \times 10^{-25}$ is plotted on the vertical axis. Based on these plots, a gain of 0.5 dB has been determined for a length of about 4 cm.

An optical waveguide for present purposes begins with melting a glass having a composition as defined above. A thin wafer or flat disk is formed from the melt. This may be a pressed body, or one cut from a larger body. In either case, the body is finished as required.

The glass body is then selectively coated with a mask preparatory to treatment in a molten salt bath. The selective coating is impervious to ion migration. It covers the glass surface, except for a narrow zone left exposed on the glass surface. The mask may be an oxide coating as described in U.S. Pat. No. 3,857,689 (Koizumi et al .), or may be any other suitable resist coating.

The masked glass body is then exposed to a thallium salt bath to exchange thallium ions for sodium and/or potassium ions from the glass. The salt bath is at a temperature in the range of 350°–450° C. and exposure will be for a time sufficient to form a fibre-like, ion-exchanged zone in the exposed glass surface. The masked glass body is then exposed to an alkali metal salt bath, e.g. a $KNO_3$ bath, at the same temperature, to drive the thallium-ion fibre into the glass by further ion exchange. The protective mask is then removed to complete the process.

I claim:

1. An optical signal amplifier comprising an optical waveguide fiber integrated by thallium ion exchange in a boron-free silicate glass doped with up to 5 weight % erbium oxide, the glass having a base composition, as calculated in weight percent on an oxide basis, consisting essentially of

| | | | |
|---|---|---|---|
| $SiO_2$ | 38–67 | ZnO | 1.5–8 |
| $K_2O$ | 0–25 | | |
| $Na_2O$ | 0–20 | PbO | 0–37 |
| $Na_2O + K_2O$ | 15–30 | $P_2O_5$ excess | 0–5 |
| BaO | 0–7 | $P_2O_5$ + PbO | 5–37 |
| $Al_2O_3$ | 1.5–4.5. | | |

2. An optical signal amplifier in accordance with claim 1 wherein the erbium doping level does not exceed about 3 weight %.

3. An optical signal amplifier in accordance with claim 1 wherein the erbium-doped amplifier has an excited-state lifetime of at least 8 milliseconds.

4. An optical signal amplifier in accordance with claim 1 wherein the glass has a transformation temperature below 500° C., whereby thallium ion exchange can occur at a temperature in the range of 350°–450° C.

5. An optical signal amplifier in accordance with claim 1 wherein the glass contains both $K_2O$ and $Na_2O$ in its composition.

6. An optical signal amplifier in accordance with claim 5 wherein the $K_2O:Na_2O$ ratio is at least 2:1.

7. An optical signal amplifier in accordance with claim 1 wherein the glass has a base composition consisting essentially of, as calculated in weight percent on an oxide basis,

| | | | |
|---|---|---|---|
| SiO$_2$ | 52–56 | ZnO | 1.5–8 |
| K$_2$O | 0–25 | | |
| Na$_2$O | 0–20 | PbO | 10–15 |
| Na$_2$O + K$_2$O | 18–26 | P$_2$O$_5$ excess | 0–5 |
| Na$_2$O:K$_2$O | 0.3–0.5 | P$_2$O$_5$ + PbO | 15–20 |
| BaO | 0–3 | | |
| Al$_2$O$_3$ | 1.5–4.5 | | |

8. An optical amplifier in accordance with claim 1 wherein the glass body is in the form of a water or flat disk in which the thallium ion exchange is for sodium and/or potassium ions at a temperature of 350°–450° C.

9. An optical amplifier in accordance with claim 8 wherein the ion exchange is limited to a narrow zone within the surface of the glass body.

10. A glass having ion exchange properties particularly adapted to production of optical signal amplifiers operating at a wavelength of about 1.5 microns, that is free of B$_2$O$_3$, that is capable of being doped with up to 5 weight % erbium oxide, that has good spectroscopic properties and that has a base glass composition consisting essentially of, on an oxide basis as calculated in weight percent,

| | | | |
|---|---|---|---|
| SiO$_2$ | 38–67 | Al$_2$O$_3$ | 1.5–4.5 |
| Na$_2$O | 0–20 | ZnO | 1.5–8 |
| K$_2$O | 0–25 | | |
| Na$_2$O + K$_2$O | 15–30 | PbO | 0–37 |
| BaO | 0–7 | P$_2$O$_5$ | 0–5 |
| | | P$_2$O$_5$ + PbO | 5–37 |

11. A glass in accordance with claim 10 having a transformation temperature below 500° C. whereby thallium ion exchange can occur at a temperature in the range of 350°–450° C.

12. A glass in accordance with claim 10 wherein the composition contains both K$_2$O and Na$_2$O, the total of these oxides being 15–30% by weight.

13. A glass in accordance with claim 12 wherein the K$_2$O:Na$_2$O ratio is at least 2:1.

14. A glass in accordance with claim 10 having a base composition consisting essentially of, on an oxide basis as calculated in weight percent

| | | | |
|---|---|---|---|
| SiO$_2$ | 52–56 | ZnO | 1.5–8 |
| K$_2$O | 0–25 | | |
| Na$_2$O | 0–20 | PbO | 10–15 |
| Na$_2$O + K$_2$O | 18–26 | P$_2$O$_5$ excess | 0–5 |
| K$_2$O:Na$_2$O | 2–3.3:1 | P$_2$O$_5$ + PbO | 15–20 |
| BaO | 0–3 | | |
| Al$_2$O$_3$ | 1.5–4.5 | | |

15. A glass in accordance with claim 10 wherein the glass composition is modified within a selective area by at least partial replacement of potassium and/or sodium ions by thallium ions.

16. A method of making an optical signal amplifier which comprises the steps of forming a glass body in the form of a disk or water from a glass melt having a composition consisting essentially of, on an oxide basis in percent by weight,

| | | | |
|---|---|---|---|
| SiO$_2$ | 38–67 | ZnO | 1.5–8 |
| K$_2$O | 0–25 | | |
| Na$_2$O | 0–20 | PbO | 0–37 |
| Na$_2$O + K$_2$O | 15–30 | P$_2$O$_5$ excess | 0–5 |
| BaO | 0–7 | P$_2$O$_5$ + PbO | 5–37 |
| Al$_2$O$_3$ | 1.5–4.5 | | | the glass having a Tg below 500° C., selectively masking the surface of the glass body against ion exchange, except for a selectively exposed area, exposing the selectively masked body to a molten thallium salt bath at a temperature in the range of 350°–450° C. for a time sufficient to integrate an optical fiber into the glass body.

* * * * *

UNITED STATES PATENT AND TRADEMARK OFFICE
CERTIFICATE OF CORRECTION

PATENT NO. : 5,475,528
DATED : December 12, 1995
INVENTOR(S) : Pascale Laborde

It is certified that error appears in the above-indentified patent and that said Letters Patent is hereby corrected as shown below:

Column 2, line 17, "B2O3" should be --$B_2O_3$--.

Column 3, line 19, "necessary successful" should be --necessary for successful--.

Column 4, line 45, "Er⁺" should be --$Er^{+3}$--.

Column 5, line 44, "tier" should be --for--.

Column 7, line 12, "water" should be --wafer--.

Column 8, line 21, "water" should be --wafer--.

Signed and Sealed this

Fourteenth Day of May, 1996

Attest:

BRUCE LEHMAN

*Attesting Officer*     *Commissioner of Patents and Trademarks*